Figure 8:
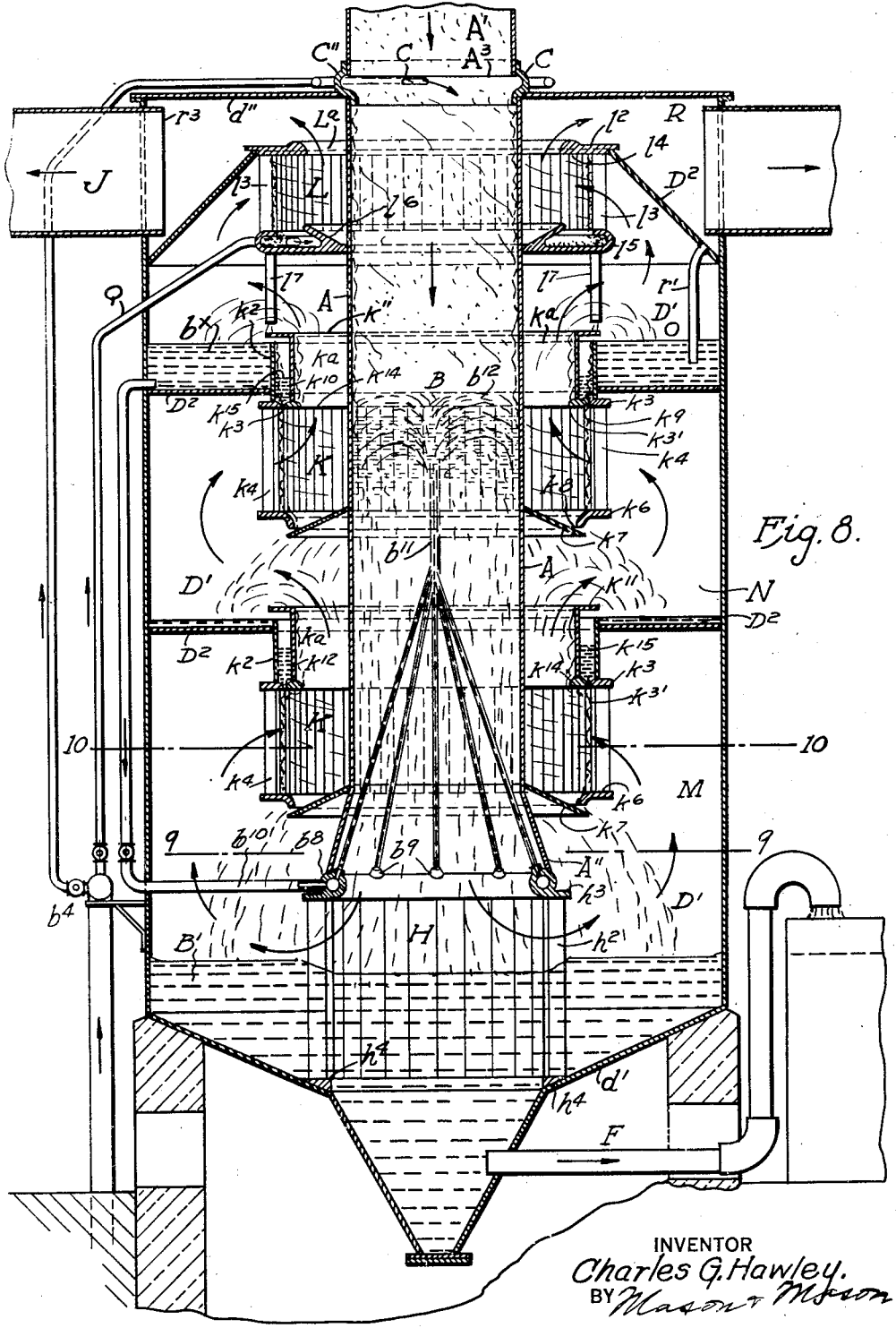

Nov. 13, 1934.  C. G. HAWLEY  1,980,522
APPARATUS FOR THE TREATMENT OF GASES
Original Filed June 25, 1930  6 Sheets-Sheet 1
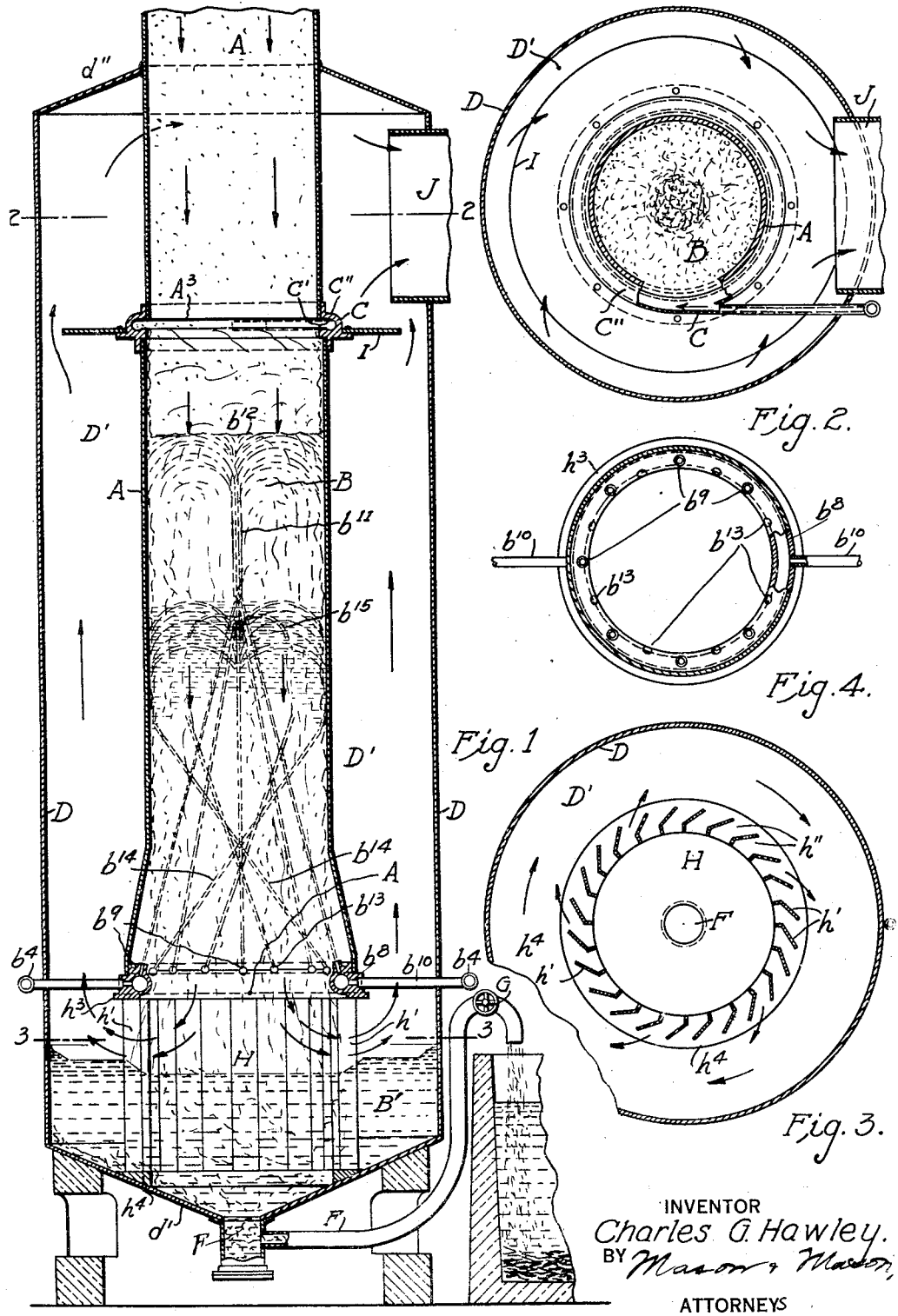
INVENTOR
Charles G. Hawley.
BY Mason & Mason
ATTORNEYS

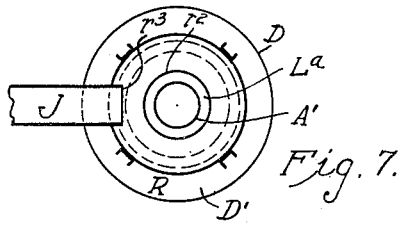
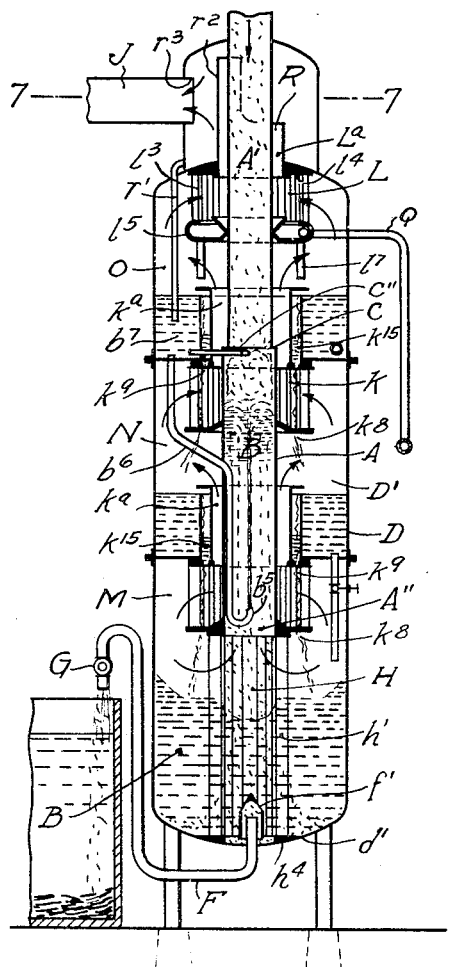
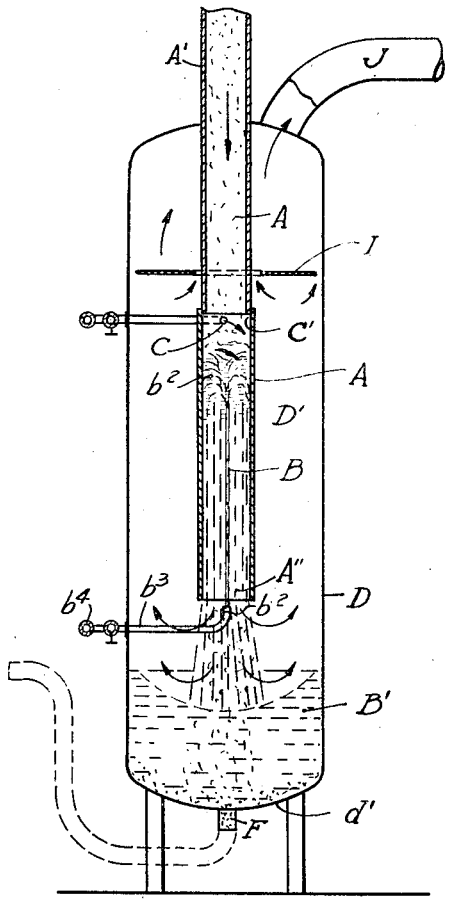

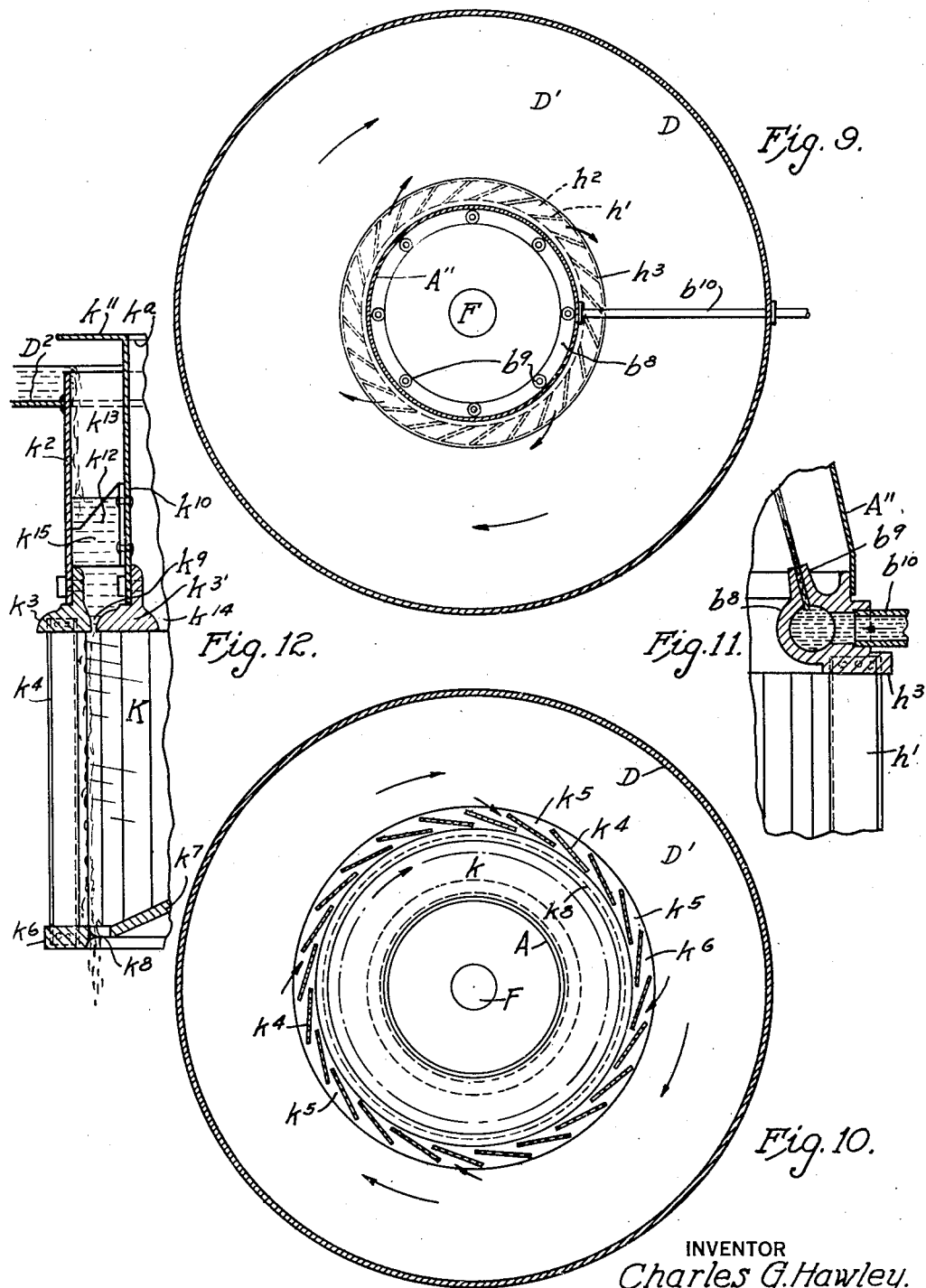

Nov. 13, 1934.   C. G. HAWLEY   1,980,522
APPARATUS FOR THE TREATMENT OF GASES
Original Filed June 25, 1930   6 Sheets-Sheet 6

INVENTOR
Charles G. Hawley.
BY Mason & Mason
ATTORNEYS

Patented Nov. 13, 1934

1,980,522

UNITED STATES PATENT OFFICE 1,980,522

APPARATUS FOR THE TREATMENT OF GASES

Charles Gilbert Hawley, Chicago, Ill., assignor to Centrifix Corporation, Cleveland, Ohio, a corporation of Ohio Original application June 25, 1930, Serial No. 463,734. Divided and this application January 19, 1931, Serial No. 509,749

9 Claims. (Cl. 183—24)

The invention has for its purpose, and comprises an apparatus wherein and whereby natural and manufactured gases may be, and are, changed in nature or condition by the separation of objectionable or of valuable substances, or by the addition of absorbable substances; and wherein and whereby such gases and vapors may be heated, or cooled, as required; all by intimate admixture and contact with a supplied liquid or liquids appropriate to the individual needs. The purification of natural and of manufactured gases, the dehydration of such gases, and, the so-called conditioning of air together exemplify one group of uses to which the invention is suited; and, recoveries of tars, oils and condensable vapors from both natural and manufactured gases exemplify still another group.

Alternatively, this invention has for its purpose, and comprises, an improved apparatus wherein and whereby liquids of various kinds may be, and are, changed in nature or condition through being heated or cooled, deprived of volatile burdens, or supplemented by the addition of absorbable substances; all by intimate admixture and contact with a supplied gas or gases appropriate to the individual needs. The aeration, the gasification, and the "loading" of liquids and the cooling and heating of liquids all exemplify such uses of this apparatus.

Whatever the use or purpose, the invention proceeds by organizing rapidly moving streams of the gas and the liquid required for the given case, and then dynamically opposes such streams one to the other, thereby continuously or progressively shattering and dispersing the liquid stream by means of and within the stream of gas and thus causing the intimate contact of the differing fluids. After initially opposing the gas stream, the liquid falls to a point below that at which the gas emerges from the initial contact stage but for an appreciable period preceding such escape the fluids are held or retained in this state of intimate admixture. The instant interchange of heat or of the substances required to produce the desired ultimate result is thus ensured and accomplished. The operation ends with the separation of the fluids, in their changed states; the gas passing to its further uses and the returned liquid being allowed to waste away or being treated by known processes requisite to its conservation or for the separation or recovery of the substances taken from the gas or other lighter fluid.

The novel apparatus or "interchanger" appropriate to and best utilizing the principles and essentials of this invention may be described most easily and will readily be understood by immediate reference to the drawings which accompany and form parts of this specification.

Figure 13:
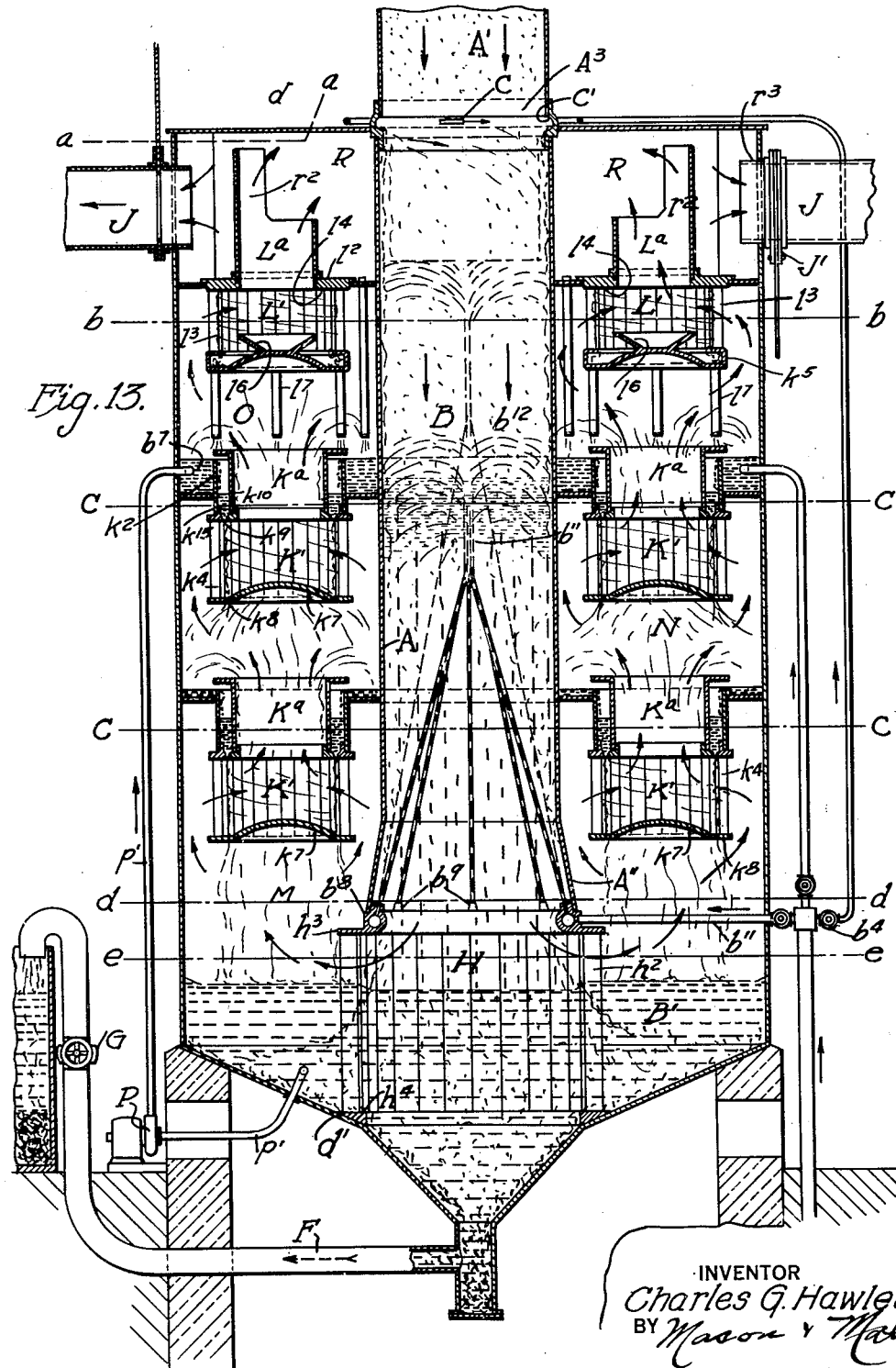
Figure 14:
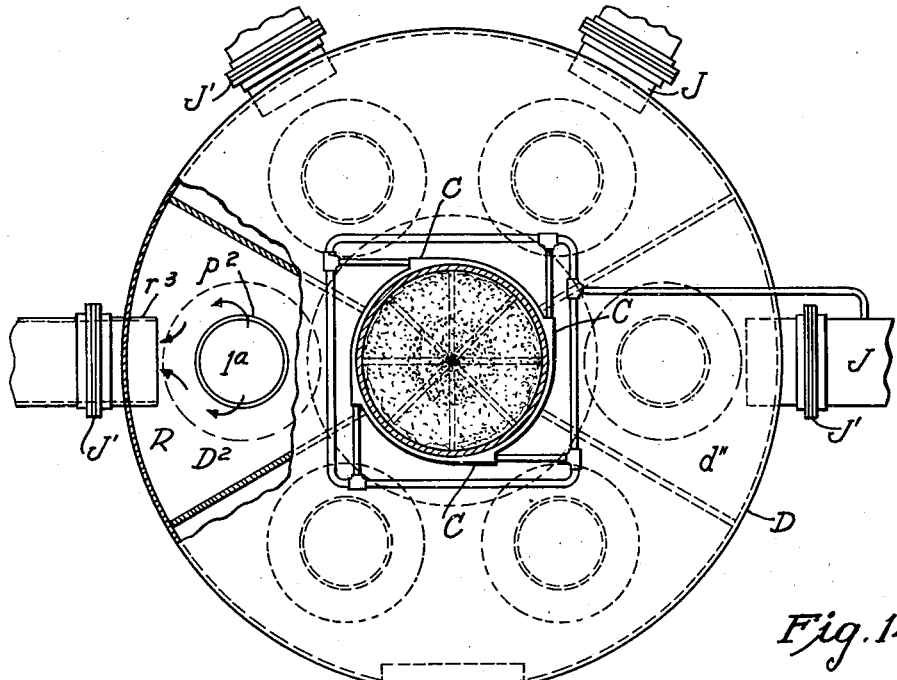
Figure 15:
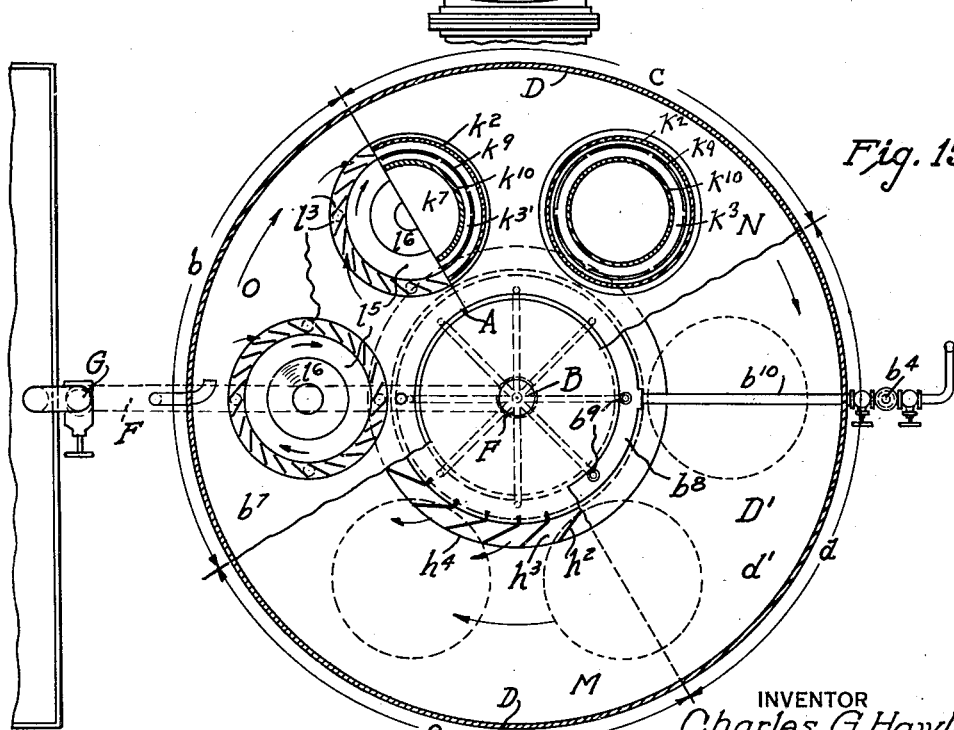

In said drawings, Fig. 1 is a vertical section of an apparatus or "interchanger" embodying this invention and whereby the above described operation or process may be practised; Fig. 2 is a horizontal section on the line 2—2 of Fig. 1; Fig. 3 is a horizontal section on the line 3—3 of Fig. 1; Fig. 4 is a plan view of the liquid jetting element which occupies or forms the lower end of the gas downgoer or entrance duct shown in Fig. 1; Fig. 5 illustrates an interchanger of smaller capacity and simplified form and here included chiefly for the purpose of indicating that the liquid depths of these interchangers are substantially the same for like working gas pressures; Fig. 6 is like unto Fig. 5 but illustrates certain supplementary means which may be employed to finish or perfect the work done in the first stage of the process; Fig. 7 is a horizontal section on the line 7—7 of Fig. 6; Fig. 8 is a vertical section comparable with Fig. 6 but illustrating an apparatus of the capacity of Fig. 1; Fig. 9 is a horizontal section substantially on the line 9—9 of Fig. 8; Fig. 10 is a horizontal section on the line 10—10 of Fig. 8; Fig. 11 is an enlarged sectional detail of the liquid jetting element appearing in Figs. 1, 8 and 13; Fig. 12 is an enlarged sectional detail of the side portion of a gas refining fixture, better illustrating the means and method of feeding liquid to and throughout the inner circumference thereof; Fig. 13 is like unto Fig. 8 but illustrates the employment of the gas refining fixtures in multiple, at each stage; Fig. 14 is a top view taken from Fig. 13, a portion of the top being broken away on the line a—a of Fig. 13, to disclose one of the several dry gas chambers of that structure; and, Fig. 15 is a compound horizontal section, its parts comprising successive horizontal sections upon the lines b—b, c—c, d—d, and e—e, of Fig. 13.

The arrows appearing upon these drawings, save as specially noted, indicate the courses of the gases in their respective interchangers. As stated, these interchangers are of different capacities; they differ somewhat in design, and the differing parts will be pointed out; but for the sake of clearness and brevity the parts which are common to all will be identified by the same reference characters, as best calculated to indicate their corresponding functions.

In an important sense, the gist or principle of this interchanger resides in confining a swiftly flowing gaseous stream to a restricted channel, duct or course, such as the part A; and in subjecting the restricted or confined stream to the axially directed attack of a fountain, B, which comprises one or several streams of liquid; that is, utilizing the forces of direct impact to accomplish the dissemination, the filming and the shattering of the liquid and its intimate contact with all parts of the flowing stream of gas.

By preference, and to ensure the best action, the duct A occupies a vertical position as contrasted with any inclined position, and the gas moves directly downward therein, that is, from the part A' toward the open lower end of A".

The impulsion of the gas, obviously, is derived from any convenient source, or from a blower which delivers the gas to the duct-end A', or motion may be imparted by an exhauster which takes effect at the lower end of A" of the confining duct.

Similarly, the liquid derives motion from any convenient source of pressure, and the pressure is sufficient to deliver the stream, jet or jets upward within the duct A, against the force of the downrushing gas.

The extent to which the stream of liquid penetrates the stream of gas is governed by, and is to be governed according to the densities and velocities of the lighter and heavier fluids.

The simplest of means may be used to initiate and direct the fountain of liquid within the downgoer or gas duct A. In downgoers of the smaller diameters, a single jet may serve the purpose, as well represented in Figs. 5 and 6. In Fig. 5 the jet nozzle is marked $b2$ and is supplied with pressure liquid by means of a pipe $b3$ and liquid main $b4$, a regulating valve, either automatic or manual, being provided in the supply pipe $b3$. Turning to Fig. 6, it will be seen that the fountain nozzle $b5$, upturned within the base of the downgoer, is supplied through a down pipe $b6$ which takes liquids from a receiver $b7$ provided within the upper part of the containing sump or casing. Obviously, the fountain within the downgoer can never rise higher than the source of reservoir $b7$ (see also $b^x$ in Fig. 8) and as the reservoir is constantly filled with liquid and has its own overflow, this arrangement provides quite the ideal way of defending the fountain from any misadjustment at the hands of the attendant or operator. Obviously, the height of the reservoir is made to accord with the maximum density and velocity of the gas within the interchanger duct A.

For the maintenance of fountains within the downgoers of the larger diameters and for sake of nicety of liquid distribution, it is best to use multiple nozzle arrangements like those which appear in Figs. 1, 4, 8, 9, 11, 13, 14 and 15. Most conveniently and to avoid choking the outlet of the duct A, the lower end of the downgoer is enlarged to accommodate an annular liquid header $b8$, which latter is equipped with a plurality of nozzles $b9$, all inclined toward the axis of the downgoer A. One or more pipes $b10$ supply each such header ring with pressure liquid. The arrangement usually employed provides for the meeting of the many jets in the upper axial portion of the downgoer, as indicated at points marked $b11$. Thereby the several liquid streams or jets are caused to impinge, glance, or ricochet upon one another; which results in the formation or evolution of a more nearly perfect umbrella-like fountain crest or crown, as well shown at points marked $b12$. Thereby the shattering of the liquid is initiated and each particle is most efficiently presented in upward opposition to the opposing blast of down-going gas.

A plurality of such fountains, reaching to different heights, may be employed in a single downgoer. But such plural fountains are rarely needed and when required the need is better supplied by the use of differently initiated fountains, after the manner also shown in Fig. 1. As illustrated, the annular header $b8$ of Fig. 1, in addition to the already described circumferential series of nozzles $b9$, is equipped with a second series of nozzles $b13$, so inclined that each jet $b14$ impinges upon an opposite inner surface of the duct A, and at a level considerably above the nozzles. Upon thus impinging the wall each jet expends its force upwardly, and then of necessity falls inward; that is, toward the axis of the duct. A reverse or involute umbrella of liquid is thus dependably positioned across the path of the downgoing gas, and a fine intermixing of the liquid and gas is thus ensured, as well indicated at the point marked $b15$ in Fig. 1. This involute fountaining arrangement will be found admirable for association with the before described axially generated fountain; and obviously, may be the only arrangement used, for in some cases it may be substituted for the axial fountain.

Under any given adjustment or relation, the active stream or fountain of liquid playing upward within the duct A exhausts its force against the downrushing gas, and, changing its direction, the liquid joins the downward course of the wetted gas still within the duct. The impact of the gas upon the upward moving liquid serves to minutely distribute the liquid throughout the cross section of the gas stream, and the state of intimate admixture persists until the gas is discharged from the lower end of the duct.

As observed in a transparent structure specially devised for the purpose, each particle of water arriving at its peak of upward motion is flattened or spread out in a radial direction, transverse films being distinctly visible. Next these films are quickly shattered into minute particles thus organizing and maintaining a fine mist which completely permeates the entire cross section of the stream moving swiftly downward within the confining duct A. This mist and consequent intimate admixture with the gas persists for a considerable distance, measured axially. Thereafter, the amalgamation of the moisture particles begins and the discharge of gas from the lower end of the vertical duct comprises a mixture of gas and a coarser mist, more nearly resembling rain; the ultimate liquid particles having increased in size through the amalgamation of many smaller particles. Incidentally, the liquid particles formed by the impact or meeting of the opposed streams are thrown into a state of great agitation by the conflicting gas currents and thus complete permeation of the mixture is ensured.

Thus it will be seen that the descending gas is first subjected to the opposing force of the uprushing liquid and is then homogeneously admixed with that liquid in a highly comminuted state. Further, the state of admixture is maintained for a considerable period; that is, as long as the mixture remains in the downgoing duct. And this is not all, for the gas is again caused to impact the liquid at the moment of its separation therefrom, as hereinafter described.

Gases of all kinds may be treated as above described. The liquid opposed to the gas may be a scrubbing liquid or an absorbing liquid, according to the work to be done. The homogeneous admixture and intimate contact of the gas and liquid inevitably result in a most reliable interchange from one to the other of the fluids, and in either direction desired, causing immediate changes of condition and quality in one or both fluids.

If the gas be hot and the liquid cool, the liquid will accept heat from the gas within an instant of time, the conditions of transfer being ideal and the moisture content of the gas, if any, is reduced; for the lowering of the temperature precipitates the moisture and it is then absorbed into the larger volume of liquid composing the opposing fountain. If the liquid be hot and the gas cool, the gas will be heated and its moisture content automatically adjusted to the terminal temperature of the gas. If the gas is burdened with gaseous impurities such as ammonia, the same will be transferred to and absorbed by the liquid composing the opposing fountain. If the gas is warm and burdened with condensable vapor, such as hydrocarbon vapors, the vapor will be condensed and the moisture absorbed by the opposing liquid. Many air and gas-borne acids are likewise recoverable. If the gas be burdened with dust or solid particles of any kind, the particles are instantly wetted and enveloped by moisture and as promptly transferred to the opposing liquid. Similarly, if the gas lacks some quality or substance which is derivable from a liquid, that liquid is fountained into the downgoer or duct and the desired substance is reliably transferred to the gas under the conditions of dynamic admixture and contact here described.

It is unnecessary to restrict the operation to clarified liquids and even very foul liquids may be recirculated and repeatedly projected into the downgoing gas duct, the only limit being the maximum temperatures and concentrations which respective uses and industries place upon the fluids thus selected and opposed.

As further examples, the following are cited. By this system large volumes of air may be cleaned and dehydrated or humidified, as required, and all within a minimum of space, and by the use of a minimum of water. And as suggested in an earlier application, to wit, S. N. 447,091, filed April 24, 1930, the employment of chilled brine as the interchanging liquid, ensures not only a complete cleansing of the air or gas acted upon, but also the dehydration thereof to any degree desired. Again, and as will be apparent, the process is ideally adapted to the recovery of petroleum oils, benzol, naphthalene and the like from the gases burdened therewith. and due to the instantaneousness, the completeness and the homogeneity of the mixture within the confined or limited passage, the work may be done with a minimum quantity of absorbing oil.

The foregoing descriptions suffice to indicate much of the great scope and utility of the invention; also several of its advantages, which latter result chiefly from its simplicity. A special characteristic is evidenced by the fact that although the movement of the gas apparently and in fact is opposed by the more forcibly injected liquid, the return of the liquid takes place in the direction of the outflow of the gas and the fall of the liquid so far aids or accelerates the outflow of gas as in some measure to compensate for the initial opposition of the liquid. Thus the loss of gas pressure is minimized and the operation is made to reflect many savings.

An important step and characteristic of this invention attaches to the treatment of hot, dirty gases. Such gases, descending within the limiting or confining passage impart heat to the crown or crest of the liquid fountain therein. Thereby some of the liquid is momentarily converted into an expansible vapor which vapor promptly pervades the gas column. In that way and by this means moisture in the form of condensable vapor is disseminated throughout the gas stream, obviously surrounding the dust particles in readiness for condensation thereon and attachment thereto as soon as the temperatures of the gas and vapor are sufficiently reduced. In brief, this is a step which consists in surcharging hot gas with moisture; and, the downgoing gas, containing not only its own but an added quantity of vapor, is at the next instant subjected to the action of the densely assembled opposing mist, as before described, and thereby its temperature is reduced to a point which causes the condensation of the vapors. As of next importance, it is observed that the dust particles present in the vapor-charged gas provide the nuclei for the vapor condensates; and it follows that dust-containing moisture globules are quickly formed. Thus it is made certain that virtually all dust particles shall be and are promptly wetted, weighted and delivered downwardly along the downward rain from the fountain. This feature of the invention probably finds its greatest importance in the treatment of the hot gases which emerge from blast furnaces and the like, in which cases the gases carry great quantities of moisture in the form of steam as well as heavy burdens of dust. In those cases water is employed for the described opposing fountain and the moisture content of the gas is reduced to correspond to the temperature reduction afforded by this exposure to the fountain and at the same time practically all dust is transferred from the gas to the water.

Gases which are heavily loaded with dust and moisture always tend to clog any pipe or duct in which their movement is changed or interrupted because of the tendency of the moisture to adhere to the inner surface of the passages and there retain quantities of dust. This tendency is most marked in the case of hot gases and particularly where confronted with a cooling liquid. In the present instance, all parts below the crest or crown of the described fountain are washed by the descending liquid but the altitude of the fountain varies with each change of liquid pressure and with each change of gas velocity within the passage A and to that extent the washing of the walls is somewhat uncertain. To prevent the accumulation of dust rings upon these surfaces, it is preferred to employ means for wetting and washing the inner surface of the duct or passage to a considerable height above the crest of the fountain. As best suited to the purpose, one or several tangential nozzles, C, are applied to the downgoer or duct A at a point above the highest crest or play of the contained fountain, and through these nozzles small streams of liquid are projected against the inner surface of the duct. Spreading thereon the streams from the nozzles completely wash the intervening surfaces of the duct, that is, the surface between the nozzles and the crest of the fountain. The wetting of those surfaces prevents the accumulation of dust rings thereon and the liquid thus applied falls within the duct and aids in the cleaning of the gases.

The tangential nozzle or nozzles C may enter a duct A which is of uniform diameter from end to end but the annoyance of dirt deposits may best be wholly avoided by slightly enlarging the fountain containing portion of the duct to provide an overhanging shoulder C' as the terminus of the upper or entrance section of the duct. The nozzles C as well shown in Figs. 1, 2, 5, 6, 8, 13, and 14 enter directly below the shoulder C', and the presence of the latter ensures the downward swirling movement of the washing streams upon the underlying walls or surfaces and also prevents the spattering of liquid at levels above the nozzles. The unobstructed terminal $A^3$ of the upper or gas reception section, and the presence of the liquids from the nozzles, inhibits the clogging of the surfaces of the duct. By preference the specific shouldering arrangement employed comprises a grooved ring C'' which also serves to unite the two parts of the duct A. The cross section of the nozzle-containing ring C'' may be modified to suit various conditions, as will be clearly understood by comparison of the showings in the several figures of the drawings. Also, as there suggested, the shoulder ring may ordinarily be united with the top or intermediate floor of the sump or casing D in which the described process is conducted.

Reverting now to the action of the stream of mixture discharged from the lower end A'' of the duct A, and having reference to its before mentioned further contact with the liquid, it will be seen from the drawings that the mixture is received by and upon a body B' of the returned liquid. That body is maintained in said chamber or sump D, the upper part of which provides the avenue through which the treated gas is released or escapes. The downward moving stream, upon leaving the duct A, impacts the surface of the liquid B' and thus that standing body of liquid is compelled to receive, and it thereafter retains the descending shower of liquid streams and particles together with the substances which the returning liquid may have accepted from the gas. At the same time the gas, which is thus freed from liquid and accompanying dust, if any, expands or passes out radially into and within the larger sump; finally rising therein to a point of escape or to levels of further treatment as hereinafter described.

In each case the bottom of the sump is provided with an overflow as a means of maintaining a proper liquid level in the sump. By preference, the overflow takes the form of an elevated or pressure balancing drain such as the drains marked F in the several figures of the drawings. These drains preferably contain regulating valves G as indicated in Figs. 1, 6 and 13. The drain rises upon the exterior of the sump and to a level which corresponds with the highest level of liquid maintained in the sump during operation at low gas pressure. Obviously, this provision accommodates fluctuations in the sump level such as are occasioned by increase of gas pressure within the sump, and in this way also the distance between the lower end of the duct A and the surface of the liquid is caused to increase and decrease in response to variations of gas volume and pressure. Clearly this arrangement also functions to lessen the variations of pressure in the upper part of the sump, a distinct compensating function being performed by the changing volume of liquid in the lower part of the sump.

The drain valve G is employed as an aid to the compensating actions just referred to, and in addition it is used to close the drain at times when it may be desirable to stop the flow of liquid. This last is done by merely closing the valve and allowing the fountain to continue until the liquid accumulates in the sump and submerges the lower end of the duct A to a depth that prevents the exit of gas from the duct. Thus the contrivance is utilized to perform all of the useful offices of the separate valve structures commonly employed in gas lines. As to the sump itself and as hereinafter explained, provision is made for the continuous cleansing of the sump to prevent clogging of either sump or drain, during periods of operation, as commonly experienced with ordinary gas valves.

The devices marked H and which are interposed between the lower ends of respective ducts A and respective sump bottoms $d'$ primarily perform the function of breaking up the gas stream and uniformly distributing the gas within the sump. Second, each device H also performs the important function of directing the downward blast of gas and returned liquid perpendicularly against the underlying body of liquid B'. By preference, the drain F leads from the center of the sump bottom, that is, from within the element H, which therefore functions to deliver directly to the drain the greater part of the returning liquid and the greater part of any dust content received from the gas.

It is a common experience to find the bottoms of gas washing sumps and towers clogged with settled solids, and for the avoidance of that difficulty, as well as for the attainment of other benefits which will be mentioned, the element H is preferably contrived and made to function as a promoter of rotation within the sump. By means thereof rotation is imparted to the liquid B' and such rotation of the liquid prevents the settlement of solids upon the bottom of the sump to any such extent as might interfere with the operation, and further, the solids are thereby reliably delivered to the central drain, toward which there is a constant flow of liquid, except when the valve G is closed. Next, the rotation which is imparted to the departing gases by the specially devised element H, not alone keeps the liquid in rotation, but at the same time tends to centrifugally precipitate foreign substances against the vertical wall of the sump, thence to fall into the liquid body.

By preference, the gas distributing, directing and rotation imparting element H comprises a fixed barrel-like slotted structure or multiple tuyère which is composed of tangentially disposed blades $h'$; together forming a circumferential series of tangential exit tuyères $h''$. By preference also, these blades are extended from the lower end of the duct A to the bottom $d'$ of the sump; and therefore, they are always partially submerged in the liquid B'. The aggregate area of the tuyères $h''$, the openings between the blades, is adequate for the outflow of the gas under all conditions and at the same time ample provision is thereby made for the flow of liquid between the periphery of the sump and the drain as required for the discharge of some of the solids.

Most conveniently, the top of the distributing element H comprises a ring $h3$ to which the upper ends of the blades $h'$ are fastened, the connections being rigid. The lower ends of the blades are conveniently fastened in or upon the bottom ring $h4$.

It is clearly to be understood that while a rotary element may be substituted for imparting rotation to the content of the sump, the element H here shown is fixed and does not rotate. The rotation required, results from the tangential arrangement of the blades $h'$ as before mentioned, and as clearly exhibited in Figs. 3, 9 and 15. The angular exit of the gases from the tangential tuyères $h''$ obviously causes the gases to swirl or rotate within the receiving sump. In interchangers employing jet headers $b8$, as before mentioned, such headers may be combined with the top ring $h3$ of the associated element H, as most clearly exhibited in Figs. 1, 4, 8, 9, 11, 13 and 15.

As illustrated in Figs. 1 and 5, the gases discharged from the duct A and rising from the lower part of the sump D are accommodated within a space D' which is of much larger cross section than the duct A. The gases therefore rise slowly, giving time for the centrifugal and gravity precipitation of any residue of heavier particles. Thereafter, and unopposed, unless perhaps by a distribution baffle or floor I, the gases are permitted to escape at the top of the sump; that is, through an outlet or outlets J. In other cases, and as represented in the remaining figures of the drawings, means are provided for the further refinement of the gas while still within the sump or casing D.

Before describing the sump-contained refining devices, special attention is directed to the fact that superior refinement of the gases may be arrived at directly by passing the gases from an initial sump into an identical apparatus of like construction and containing a similar fountain of liquid. In other words, the gas may be presented to successive fountains in adjacent sumps. In that case, the liquid after serving in one sump, may be used in the next sump or effect. The direction of flow of the liquid should be under the control of the operator to the end that he may present the coolest liquid to the hottest gas, or vice versa, as differing uses may demand. Likewise, this last is a matter to be observed in dealing with the extended or gas refining interchangers shown in Figs. 5 to 15.

In dealing with hot and dirty gases containing much vapor, such as blast furnace gas, two and even three such repetitions or "effects" may be employed, within one or several sumps; and the coldest liquid being used in the last "effect" to ensure the best dehydration of the gas, while the hottest liquid is used in the first "effect" to take advantage of the marked affinity of water and dust, assuring both the interception of the dust and a sufficient initial precipitation of the gasborne moisture.

The above defined refinement of the gas following its discharge from the downgoer and before it is allowed to leave the sump, is best accomplished by both wet and dry treatments that are administered through the medium of non-rotative centrifugal devices of the type now generally known as centrifixtures. Specifically, the centrifixtures identified as K and K' in Figs. 6, 8 and 13 are those which are devoted to further gas-and-liquid mixing operations, while the centrifixtures there marked L and L' are devoted to the final "drying" of the outgoing gases.

Upon consideration, it will be seen that the fixtures K and K' here shown, are such as are described and claimed in U. S. Patents No. 1,539,435 and No. 1,612,836 and more specifically disclosed and claimed in my earlier application S. N. 238,038 filed December 6, 1927. But these fixtures K and K' differ in certain features, which will be explained. The fixtures here marked L and L' are such as are described and claimed in U. S. Patents No. 1,539,435 and No. 1,539,478, but the particular fixtures here shown also embody certain novel details, to which special reference is directed.

Best to enable the progressive use of such fixtures, the containing sump or casing D is divided into several distinct compartments, such as those marked M, N, and O in Figs. 5, 8 and 13. The lower compartment M is always used. The number of superimposed compartments varies with the number of "passes" or "effects" deemed necessary. These compartments are formed by the horizontal elements or floors D2, built into the walls of respective sumps D. The downgoer A, in each case, descends through the several floors and opens within the lowest compartment or story M. The fixtures K and K', L and L' appearing in the several parts of the drawings are supported by respective floors D2 and serve to place the compartments in communication in series, the gases flowing from the lower compartment upward through the superposed compartments and finally escaping through the outlet or outlets J before identified.

The cooling, scrubbing or absorbing liquid that is used in the refining stages of this process descends from the top of the sump, and having served its purpose in the lowermost centrifixture is either discharged from the sump (not shown) or is recirculated (not shown) or is allowed to fall into the bottom of the sump. The liquid used in the refining stage, may be taken from any point or stage and employed (through the aid of a suitable pump) to maintain the fountain within the respective downgoer. Such arrangements appear in Figs. 6 and 8 and optionally in Fig. 13. Again, as suggested by the motor driven pump P and piping $p'$ of Fig. 13, liquid may be taken from the lower part of the sump and elevated for use in the interposed washing or scrubbing fixtures. By these differing arrangements provision is made for subjecting the hottest gas to the coldest liquid; and, reversely for the subjection of the coldest gas to the hottest liquid, as before defined; and as may be required to effect the best results and economies. Further details will appear hereinafter.

As shown, the centrifixtures occupy the space betwen each downgoer A and the vertical wall of its sump. The centrifixtures are generally cylindrical and a single fixture may be used in each story of the sump, as shown in Figs. 5, 8 and 9. In such cases the centrifixtures are coaxial with the downgoer, which passes through them. In the case of Fig. 13, where a plurality of each kind of fixture appears, the figures are quite independent of the downgoer, being held or suspended alongside the same. (See also Figs. 14 and 15.)

Intentionally, the downgoers of Figs. 8 and 13 have been shown as of the same cross sectional size or capacity, and it is to be noted that the openings or outlet passages $Ka$ through which the centrifixtures K of Fig. 8 and the opening $La$ of the fixture L communicate with succeeding compartments, have cross sectional areas which equal and indeed much exceed the area of the downgoer. Similarly, the corresponding openings or passages (also marked $Ka$) of the more numerous and smaller centrifixtures of Fig. 13, in each stage, aggregate an outlet area which exceeds that of the associated downgoer. In explanation, the gas expends some energy in passing through succeeding centrifixtures and the pressure drop, between the inlet and outlet of the sump, is most advantageously minimized by providing the centrifixtures with these generous outlets. These ratios or proportions have further important relations to the process as a whole, as will appear in the detailed description of the differing centrifixtures.

Next in sequential importance the said outlets Ka of the centrifixtures provide obviously restricted or constricted communication between the much larger compartments of the sump and the progressive restriction and liberation of the ascending gas stream has a marked effect upon the cleaning of the gas, inasmuch as that treatment serves to liberate and throw down the heavier substances that may be carried by the gas, including particles or globules of moisture. The precipitated substances fall upon the floors of the compartments and ultimately drain into the bottom of the sump.

Each fixture K, K', is made up as follows: A cylindrical sleeve $k2$ penetrates and is tightly jointed to its floor D2. The height of the sleeve is proportioned to the maximum pressure drop which may occur in the fixture, for the sleeve in addition to supporting the fixture proper, is called upon to play a part in feeding liquid thereto. Fixed to the lower end of the sleeve is a ring $k3$ and fixed to that ring is a circumferential series of operatively overlapping tangential blades $k4$ all having the same direction and therewith forming a whirl-promoting tuyère unit through which the gases enter the fixture. The blades $k4$, best shown in Figs. 10 and 15, provide numerous tangential entrance tuyères $k5$ and clearly the gas passing inward therethrough is caused to take on a whirling motion within the tuyère unit or bladed barrel as a whole. The lower ends of the blades are rigidly united by and together support a bottom ring $k6$, which in turn is associated with the unit bottom $k7$. The latter, as variously shown in Figs. 5, 8, 10, 12, 13 and 15, is provided with a peripheral liquid discharge opening or openings $k8$. Supplementing the top ring $k3$ is a smaller ring $k3'$, forming an annular top abutment for the unit or fixture and which abutment restrains the whirling products within the unit or fixture. The ring $k3'$ is of smaller diameter than the ring $k3$, leaving an opening or crack $k9$ between them. The width of the opening $k9$ is less than the width of a liquid drop; for surface tension is ultimately depended upon to control the feed or fall of the treating liquid into the fixture, as will be more fully explained. Tightly attached to the ring $k3'$ is an inner sleeve $k10$ which defines the before mentioned outlet Ka and rises to a level above the top of the sleeve $k2$. Preferably, its top is marked by a distending flange $k11$. The rigidly united parts $k3'$, $k10$ and $k11$ are supported from the sleeve $k2$, or otherwise, as best indicated by one of the supports $k12$ in Fig. 12, and a generous annular space $k13$ is provided between the sleeves $k2$ and $k10$.

During operation, liquid supplied upon the floor D2, overflows the upper edge of the sleeve $k2$ and falls within the space $k3$, the top of which is freely opened. The bottom of that space is also open insofar as it contains the crack or series of openings $k9$, but at that time a column of gas is in action, whirling within the bladed portion of the tuyère unit and escaping through the opening $k14$ within the ring $k3'$. At this point it should be explained that the effective area of the opening $k14$ or the aggregate areas of such openings in any stage or tier equals and preferably exceeds the cross sectional area of the gas entrance duct or downgoer A. The pressure of the gas within the tuyère, plus the tensional forces of the spaced surfaces forming the narrow opening $k9$, resists the fall of liquid through that opening, and in consequence a considerable stand or supply of liquid is maintained in the lower part of the annular space $k13$. If the flow of liquid were interrupted while the flow of gas continued, a compensating stand or column of liquid would remain in the space $k13$ much as indicated at the level $k15'$ appearing upon several parts of the drawings. Obviously, the height or depth of that column of liquid varies with the effective pressure of the gas within the tuyère as contrasted with the pressure of the gas in the sump compartment next above it, being a measure of pressure drop through the particular tuyèred unit. But, the flow of liquid continuing, the excess of liquid, not required to maintain the pressure-drop compensating column $k15$, is uniformly distributed throughout the circumference of the space $k13$, and uniformly feeds downward through the circumferential crack or series of openings $k9$. The shower or veil of liquid thus precipitated in the fixture is caught by the whirling gas currents therein and is also set into rotation. Thus there is organized and maintained within the tuyère, a whirling barrel-like column of liquid particles through which the whirling gas must pass before it can escape through the top opening or orifice $k14$.

Due to its greater weight, most of the whirling liquid ultimately sinks to the floor of the unit, thoroughly wetting the inner surfaces of the blades, and drains away therefrom, as through the bottom opening $k8$. Some of the liquid is caught and elevated by the gas rising through the opening $k14$ and thus is maintained in contact therewith and redelivered upon the floor D2. An extremely thorough or effective admixture of gas and liquid is accomplished by and within the described unit, and due to the persistence of the mixture, as measured by the whirling of the products within the unit, a relatively small quantity of liquid is made to produce the scrubbing or absorbing function required with respect to the larger volume of gas.

The uprushing gas, when emerging from the sleeve $k10$ into the larger compartment tends somewhat to diminish the pressure in the top of the annular space $k13$; hence the employment of the flange $k11$, which defeats that tendency.

The showing of two unit fixtures K in Figs. 6 and 8, and of two unit fixtures K' in Fig. 13 is intended to illustrate the fact that repeated washing or absorbing operations may be accomplished within any given sump and in addition, to show that the gas is preferably subjected to successive liquid treatments at different liquid temperatures, it being evident that the exchange of heat progresses from one operation to the next. Further, it is to be noted that the liquid falling from each of these tuyèred units forms a veil or annular shower through which the gas from the preceding chamber, passage or fixture must pass.

Upon entering the upper compartment, O, most of the liquid carried by the rising gas precipitates upon the floor of that compartment. The tuyèred unit L or L' is interposed at the outlet $L^a$ of the compartment, O, for the purpose of collecting and throwing back any residue of moisture or dust, which may be elevated into the top of the compartment, O.

Each unit or fixture, L, L', comprises a ring-like member $l^2$ containing the outlet or orifice $L^a$ and which serves to sustain the circumferential series of tangential blades $l^3$. Those blades form a whirl-promoting tuyère, like that above described, and of so much larger diameter than the opening $L^a$ as to provide the annular abutment $l^4$. The blades, in turn, support a bowl-like member $l^5$, and the latter is best characterized by a vortex-defeating cone or cup $l^6$. The parts $l^7$ are bowl drains. One or more peripherally disposed drains $l^7$ serve to empty the bowl of any moisture that it may receive. The operation of this fixture is made familiar by aforesaid patents. Briefly, the gas from the compartment O passes between the blades $l^3$ and entering the interior of the fixture, takes on a whirling motion beneath the annular abutment $l^4$. Substances carried by the whirling gas are whirlingly or centrifugally separated and due to the downward reaction occasioned by the presence of the annular abutment $l^4$ are deposited in the bowl, thence to be discharged through the drain or drains $l^7$. The whirling motion induces movement inward across the floor of the bowl, and if caught at the axis of the vortex such substances might be whirled upward and outward through the orifice $L^a$. This, however, is defeated by the presence of the outward and upwardly flared cone or cup $l^6$ which intercepts such substances and causes them to be whirlingly redelivered against the inner sides of the tuyère blades thence to again fall into the bowl.

Frequently, it is desired that the outgoing gas shall be further chilled, and that operaton is conveniently accomplished by admitting the fresh liquid, presumably the coldest, to the bowl of the fixture L or L', as through the medium of a supply pipe or pipes Q (see Figs. 6 and 8). The liquid thus admitted receives the impact of the downwardly reacting gas within the fixture and accepts any moisture or dust separated therein. Obviously, the liquid drains into the compartment O through the openings or pipes $1^7$ and then takes on its downward course through the lower centrifixture.

Attention is now directed to the heat interchanging function of this apparatus which is employed to impart some of the heat of the incoming gas to the outgoing gas. The action takes place whenever the outgoing gas contacts the hot downgoer and particularly in such cases as are illustrated in Figs. 1, 5 and 6, where the outgoing gas is exposed to an upper portion of the downgoer, which is above the liquid injecting nozzles C; in other words above the internally wetted part of the downgoer or duct A.

Convenience of juncture with the gas outlets J is served by providing the sump with a collecting compartment R, which indeed may serve as a final separating chamber and is drained by downpipes $r'$. Baffling parts $r^2$ and $r^3$ may be used to guard the final outlets J. As suggested in Fig. 14, the plurality of fixtures L' is taken advantage of to divide the top compartment R of that sump into a number of gas delivery compartments, for which separate outlets J and controls J' may be provided.

Sump bottoms of various forms are herein shown for the guidance of the constructor. It is desirable that they shall pitch toward the drain F. The whirling of the liquid in the sump tends to establish a vortex above a central drain, but in most cases the battering of the surface by the blast from the downgoer prevents possibility of such escape of gas downward through the drain. In special cases, a vortex-defeating bell, such as the part $j'$ is recommended for use above the drain opening.

It is of great advantage that these interchangers are so small and simple in form that they may be constructed in any of the sizes required and of any materials which best suit them to the gases and liquids that are to be treated therein.

It is to be understood that the invention, as clearly indicated by the appended claims, is not limited to the precise constructions and assemblages here illustrated; for, as will be evident to anyone skilled in the art, the process illustrated may be practised in part, as well as completely, and different assemblages of the structural elements of the apparatus may be employed, in order to utilize the individual and collective functions of the several elements. Thus, with any given arrangement of gas refining units or elements, the downgoing duct and the liquid containing sump always function very successfully; even where the liquid fountaining element is omitted. However, it is always best to employ the gas distributing tuyèred unit between the lower end of the duct and the bottom of the sump. Again that unit need not reach to the bottom of the sump, but in both that and the illustrated case always performs best when it is of the tangential type here shown; for it is always best to employ the rotation imparting function, to the end that the liquid shall be rotated in the sump so that the bottom of the sump shall be "self-cleaning". Further, as is suggested in my prior application S. N. 238,038, filed Dec. 6, 1927, which on January 17, 1933, became Patent No. 1,894,744, the liquid containing sump and gas refining elements may be employed without association with the downgoing duct and fountain here shown, the "self-cleanning" characteristic of the sump bottom being preserved by the tangential admission of the gas to the lower story or compartment of the sump. It should also be noted that while best erected upon a vertical axis, the downgoer duct of this interchanger may be inclined as required to meet special conditions; in other words, the invention is not limited to verticality; hence the use of the term "upright" as it appears in the appended claims. In rare cases, the downgoer and fountain may be inverted but it is fitting to explain that those cases are limited to such as afford gas streams of a velocity adequate to the lifting of the liquid after the then downwardly directed fountain, augmented by gravity, has exhausted its force against the upward moving gas stream; indeed, except for that relation of forces the descending liquid stream or streams would not be shattered, as required under this invention.

This application is a division of my original application S. N. 463,734 which was filed June 25, 1930.

Having thus described my invention I claim as new and desire to secure by Letters Patent:—

1. The improvement herein described, comprising a gas downgoer, in combination with a sump enclosing the lower part of said downgoer, means dividing said sump into successive stories which communicate through openings, and gas treating means positioned in one or several of said openings.

2. The herein described continuous apparatus for the mutual treatment of gases and liquids at high velocities and requiring such velocities, comprising a vertically extended sump or chamber closed at the bottom for the retention of liquid and open at the top for the release of gas, in combination with means for maintaining liquid at given level in the lower part of said chamber, a gas entrance duct extending downward within said chamber and opening thereinto above the liquid level, said duct being proportioned to compel the downward flow of gas at high velocity and serving to direct the gas stream against the liquid in the lower part of the chamber, a nozzle device positioned above the liquid level and adapted to direct the required liquid centrally upward within said gas duct and in the form of a substantially solid liquid stream or fountain coincident with the axis of said duct, and, supply means adapted to supply liquid to said nozzle device to cause said solid stream of liquid to rise into the upper part of said duct against the downward thrust of the gas; until the top of said liquid stream is radially filmed, then shattered and thus uniformly diffused as mist radially throughout said upper part of the duct, and the lower part of said duct affording space within which the gas and minutely divided liquid thereafter move together until expelled from the lower end of said duct.

3. The herein described continuous apparatus for the mutual treatment of gases and liquids at high velocities and requiring such velocities, comprising a vertically extended sump or chamber closed at the bottom for the retention of liquid and open at the top for the release of gas, in combination with means for maintaining liquid at given level in the lower part of said chamber, a gas entrance duct extending downward within said chamber and opening thereinto above the liquid level, said duct being proportioned to compel the downward flow of gas at high velocity and serving to direct the gas stream against the liquid in the lower part of the chamber, a nozzle composed of an annularly arranged series of jets positioned and adapted to direct the required liquid upward within said gas duct and in the form of a single liquid stream or fountain coincident with the axis of said duct, and, liquid supply means adapted to cause such liquid stream to rise into the upper part of said duct against the downward thrust of the gas; whereby the relatively elevated top of said liquid stream is radially filmed, then shattered and thus uniformly diffused as mist radially throughout said upper part of the duct, the lower part of said duct affording space within which the gas and minutely divided liquid move together until expelled from the lower end of said duct.

4. The herein described continuous apparatus for the mutual treatment of gases and liquids at high velocities and requiring such velocities, comprising a vertically extended sump or chamber closed at the bottom for the retention of liquid and open at the top for the release of gas, in combination with means for maintaining liquid at given level in the lower part of said chamber, a gas entrance duct extending downward within said chamber and opening thereinto above the liquid level, said duct being proportioned to compel the downward flow of gas at high velocity and serving to direct the gas stream against the liquid in the lower part of said chamber, a nozzle device positioned and adapted to direct the required liquid upward within said gas duct and in the form of a single liquid stream or fountain coincident with the axis of said duct, and, liquid supply means adapted to cause such liquid stream to rise into the upper part of said duct against the downward thrust of the gas, other liquid nozzles adapted to direct liquid streams angularly upward against the inner walls of said duct at a level which is below that of the top of the central liquid stream; whereby the relatively elevated tops of such liquid streams are radially filmed, then shattered and diffused as mist radially throughout said upper part of the duct, the lower part of said duct affording space within which the gas and minutely divided liquid move together until expelled from the lower end of said duct.

5. The apparatus as claimed in claim 2 and having in addition a circumferential series of tangentially positioned vertical blades forming a whirl producing tuyère coaxial with and which extends from the lower end of said gas duct and downward well below said level of the body of liquid in said chamber; whereby the gas and liquid emerging from said duct, after impacting said body of liquid, are centrifugally treated in the lower part of said chamber.

6. The apparatus as claimed in claim 2 and having in addition whirl promoting means in the upper part of said chamber through which means the moisture laden gas must pass and adapted to centrifugally separate the remaining moisture from the gas in advance of its release from the upper part of said chamber.

7. The apparatus as claimed in claim 2 and having in addition means for continuously washing the inner surface of said duct above the level at which said stream of liquid is shattered therein.

8. The apparatus as claimed in claim 2 and having in addition gas washing means positioned in the intermediate part of said chamber external to said duct and through which means the gas must pass before being released from said chamber.

9. The apparatus as claimed in claim 2 and having in addition gas washing means and gas drying means positioned in the upper part of said chamber and through which the gas must pass successively in order to be released from said chamber.

CHARLES GILBERT HAWLEY.